(12) United States Patent
Ninan et al.

(10) Patent No.: US 9,927,568 B2
(45) Date of Patent: Mar. 27, 2018

(54) UNIFORMLY LIT LIGHT GUIDES

(71) Applicant: Dolby Laboratories Licensing Corporation, San Francisco, CA (US)

(72) Inventors: Ajit Ninan, San Jose, CA (US); Chun Chi Wan, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 128 days.

(21) Appl. No.: 15/036,391

(22) PCT Filed: Nov. 12, 2014

(86) PCT No.: PCT/US2014/065165
§ 371 (c)(1),
(2) Date: May 12, 2016

(87) PCT Pub. No.: WO2015/073505
PCT Pub. Date: May 21, 2014

(65) Prior Publication Data
US 2016/0282537 A1      Sep. 29, 2016

Related U.S. Application Data

(60) Provisional application No. 61/904,664, filed on Nov. 15, 2013.

(51) Int. Cl.
*G08B 5/00* (2006.01)
*F21V 8/00* (2006.01)

(52) U.S. Cl.
CPC ......... *G02B 6/0025* (2013.01); *G02B 6/0028* (2013.01); *G02B 6/0068* (2013.01); *G02B 6/0075* (2013.01)

(58) Field of Classification Search
CPC ... G02B 6/0025; G02B 6/0028; G02B 6/0023
USPC ......... 340/815.42, 815.4, 691.1, 691.6, 332; 385/15, 27, 141; 433/29, 215
See application file for complete search history.

(56) References Cited

U.S. PATENT DOCUMENTS

| | | | |
|---|---|---|---|
| 4,249,231 | A | 2/1981 | Decaux |
| 4,460,939 | A | 7/1984 | Murakami |
| 4,735,495 | A | 4/1988 | Henkes |
| 6,229,137 | B1 | 5/2001 | Bohn |
| 6,356,700 | B1 | 3/2002 | Strobl |

(Continued)

FOREIGN PATENT DOCUMENTS

| | | |
|---|---|---|
| JP | 60-202411 | 10/1985 |
| JP | H03-107806 | 5/1991 |

(Continued)

OTHER PUBLICATIONS

Wikipedia, "Integrating Sphere", 2013.

*Primary Examiner* — Toan N Pham

(57) ABSTRACT

An apparatus comprising a light source (110), one or more light guides (104), and a light diffuser (102) having an integration chamber (114) surrounded by one or more light diffusive areas (108). The one or more light diffusive areas are configured with one or more first openings as one or more ingress areas (112) to receive light from the light source and one or more second openings as one or more egress areas (106) to provide light to the one or more light guides. For illuminating visual indicators with uniform light.

28 Claims, 9 Drawing Sheets

(56) References Cited

U.S. PATENT DOCUMENTS

| | | | |
|---|---|---|---|
| 6,422,718 B1 | 7/2002 | Anderson | |
| 7,386,203 B2 | 6/2008 | Maitland | |
| 7,521,667 B2 * | 4/2009 | Rains, Jr. | F21S 2/00 250/205 |
| 7,938,643 B2 * | 5/2011 | Rueggeberg | G01J 3/0251 433/215 |
| 2004/0151008 A1 | 8/2004 | Artsyukhovich | |
| 2007/0072442 A1 | 3/2007 | DiFonzo | |
| 2010/0020565 A1 | 1/2010 | Seward | |

FOREIGN PATENT DOCUMENTS

| | | |
|---|---|---|
| JP | 2001-176314 | 6/2001 |
| JP | 2013-153530 | 8/2013 |

\* cited by examiner

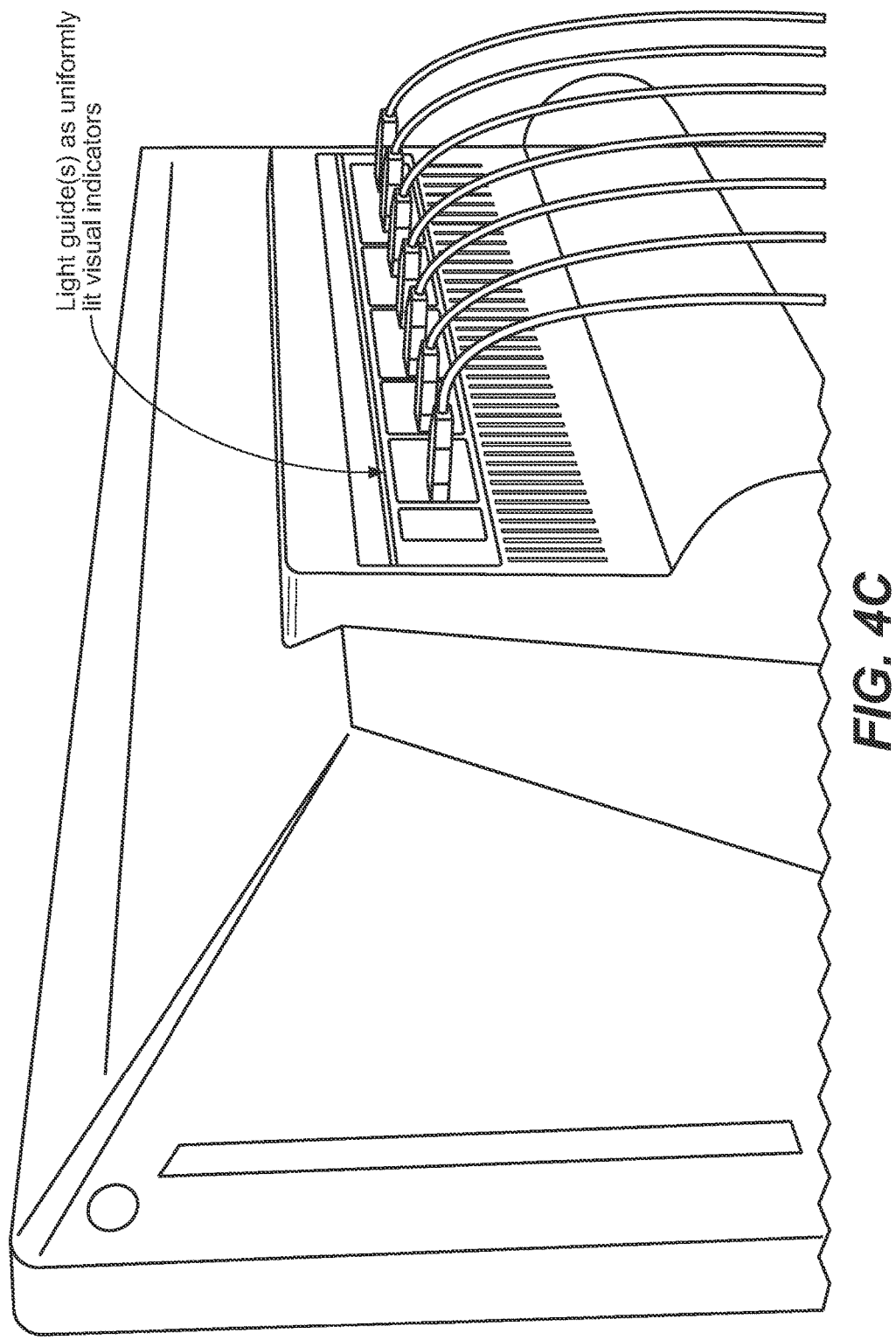

UNIFORMLY LIT LIGHT GUIDES

CROSS-REFERENCE TO RELATED APPLICATION

This application claims priority from U.S. Provisional Patent Application No. 61/904,949 filed Nov. 15, 2013, which is hereby incorporated by reference in its entirety.

TECHNOLOGY

The present invention relates generally to visual indicators in devices, and in particular, to illuminating visual indicators with uniform light.

BACKGROUND

Modern electronic devices are marvels of technologies. Many diverse components must be integrated into a specific form factor (e.g., a minimalist form factor) that evinces a great appeal to targeted customers. Visual indicators are often used in such a device to not only allow the device to be operable in dim or dark ambient light environments, but also to help convey a sense of high quality and technical sophistication.

Under some approaches, light from light sources such as light emitting diodes (LEDs) may be used to illuminate visual indicators of a device. However, hot spots often appear in the visual indicators such that the light is much brighter at the hot spots than elsewhere on the visual indicators. As a result, contrary to the original intention that caused the incorporation of the visual indicators, the device is likely to be perceived as low quality and questionable technical sophistication.

To even out light distribution on visual indicators, light guides may be lengthened, lens structures may be added to light emitters, optical amplification components such as Fresnel lens may be added in light path, etc. However, these solutions are likely expensive and difficult to implement in form factors that may be constricted with many tightly packed components and other design considerations related to the look-and-feel aspect and other aspects of devices.

The approaches described in this section are approaches that could be pursued, but not necessarily approaches that have been previously conceived or pursued by others. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A through FIG. 4C illustrate example uniformly lit visual indicators; and

DESCRIPTION OF EXAMPLE EMBODIMENTS

Figure 1A:
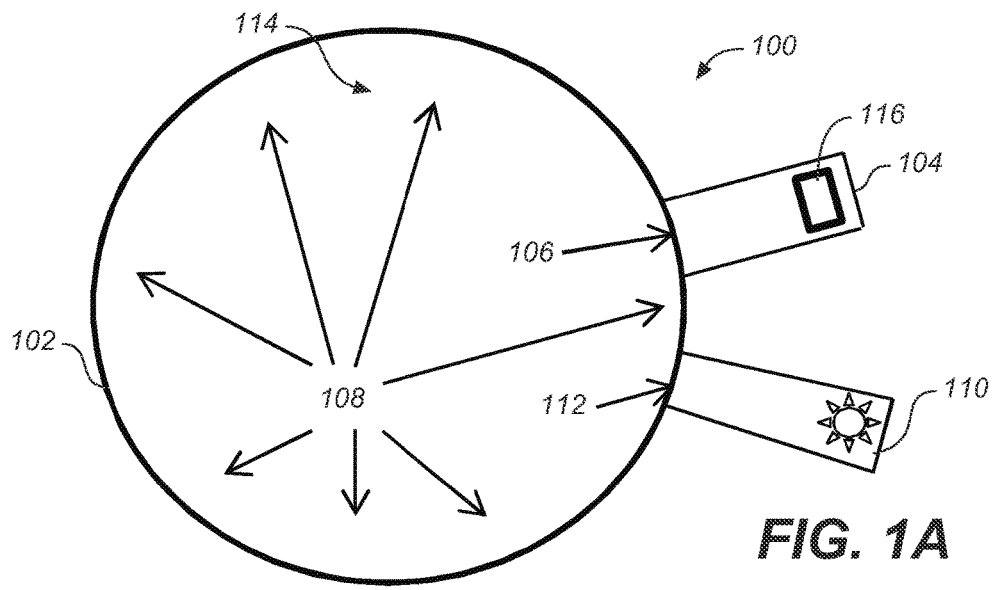
FIG. 1A and FIG. 1B illustrate example uniform lighting apparatus.

Example embodiments, which relate to uniformly lit visual indicators, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. EXAMPLE UNIFORM LIGHTING APPARATUS
3. LIGHT DIFFUSION AND INTEGRATION
4. LIGHT DIFFUSIVE FILM
5. CONFIGURATIONS OF UNIFORM LIGHTING APPARATUSES
6. DESCRIPTIONS OF SOME EMBODIMENTS
7. IMPLEMENTATION MECHANISMS—HARDWARE OVERVIEW
8. EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under techniques as described herein, a combination of a light diffuser and one or more light guides may be coupled to a light source to provide uniform light illumination for visible indicators at edges of the light guides. In some embodiments, (e.g., diffusive, etc.) surface portions of the edges of the light guides, as uniformly lit with these techniques, may serve as visual indicators of a device.

In some embodiments, the light diffuser comprises an optical cavity (e.g., air-filled, vacuum, etc.), a light transmissive medium, a light dispersive medium, a light diffusive medium, etc., surrounded by one or more light diffusive areas. The light guides are connected with the light diffuser through one or more egress openings on the light diffusive areas. The light source emits light into the light diffuser through one or more ingress openings on the light diffusive areas. The light received by the light diffuser from the light source is diffused (e.g., reflected, randomized, integrated, etc.) within the optical cavity, light transmissive medium, light dispersive medium, light diffusive medium, etc., surrounded by the light diffusive areas. The light diffusive areas can be highly reflective (e.g., with total internal reflection, etc.). Light is trapped (e.g., different portions of the light are being continuously integrated with each other, etc.) in the optical cavity, light transmissive medium, light dispersive medium, light diffusive medium, etc., and made to travel a much elongated average optical path length until exiting through the egress areas into the light guides. The light entering into the light guides from the diffuser may be (e.g., continuously, etc.) guided along longitudinal directions of the light guides towards the edges of the light guides to illuminate these edges as uniformly lit visual indicators of the device.

The light source comprises one or more light emitters, which may emit monochrome light or colored light. The amount of light (e.g., no light emission, maximum emission, intermediate levels of emissions, etc.) from the light source may be controllable, for example, based at least in part on (e.g., in correlation with, etc.) operational modes of the device.

Techniques as described herein can be used to increase light uniformity and minimize lengths of light guides with high efficiency and low costs, as compared with other techniques. By diffusing light within the optical cavity or light transmission medium, the light diffuser under techniques as described herein can produce uniform light exiting to the light guides. The actual degree of uniformity may depend in part on the relative form factors of the light diffuser and the light guides. In some embodiments, the larger the light diffuser, the more uniform the light exiting to the light guides becomes; accordingly the shorter the lengths of the light guides can be. In some embodiments, the light diffuser may take up a bulbous, multiple-bulbous, tubular, etc. form such as a spherical shape, a polygonal shape approximating a spherical shape, etc., to maximize the volume of, and thus to maximize the number of times for light reflection and diffusion within, the optical cavity, light transmissive medium, light dispersive medium, light diffusive medium, etc. Accordingly, light uniformity for the light entering into the light guides from the light diffuser is increased.

Furthermore, uniformly lit light guides as described herein can be deployed or implemented with any of a wide variety of devices with possibly challenging form factors. Costly integration of expensive optical components such as long light guides, special structure features for diffusion, collimated lens elements, Fresnel lens, etc., into light guides can be avoided under techniques as described herein. The techniques as described herein can be used to prevent or greatly reduce visual artifacts such as hot spots or noticeable unevenness in lit visual indicators of a device. As visual artifacts are prevented and reduced, the maximum amount of illumination on the visual indicators can be flexibly provisioned or controlled without sacrificing light uniformity.

In some embodiments, light diffusers and uniformly lit light guides as described herein can be deployed as a part of, or in conjunction with, a device's chassis. Any of light guides that receive light from a light diffuser as described herein, any of input light guides from which the light diffuser receives light from a light source, etc., can follow (e.g., alongside, in co-extending with, co-curvilinear, coplanar, in parallel with, etc.) a contour portion of the chassis or otherwise assume a conformal shape that best fits an overall packaging design scheme without creating difficulty for integrating other components in the device.

In some embodiments, mechanisms as described herein form a part of an image processing system, including but not limited to: a display system, a server, studio system, art director system, image editor, color grading or mastering tool, professional reference monitor, animation system, movie studio system, theater systems, cameras, TVs, broadcast system, media recording device, media playing device, video projector, screen (e.g., matte screen, gray screen, silver screen, lenticular screen, or the like), laptop computer, netbook computer, tablet computer, cellular radiotelephone, electronic book reader, point of sale terminal, desktop computer, computer workstation, computer kiosk, or various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. EXAMPLE UNIFORM LIGHTING APPARATUS

FIG. 1A illustrates an example configuration of a uniform lighting apparatus 100 that comprises a light diffuser 102 with one or more light diffusive areas 108. The uniform lighting apparatus (100) further comprises one or more light guides 104 that are connected with the light diffuser (102) through one or more egress areas 106 on one or more light diffusive areas (108). The uniform lighting apparatus is coupled with a light source 110 through one or more ingress areas 112 on the light diffusive areas (108). The light source (110) can comprise one or more light emitters (118) such as LEDs, etc. The light diffuser (102) comprises an integration chamber 114 that are surrounded or substantially (e.g., with the only exceptions of the ingress areas 112 and the egress areas 106, etc.) enclosed by the one or more diffusive areas (108). Light received from the light source (110) is diffused (e.g., reflected, randomized, integrated, etc.) with the integration chamber (114) and exits from there into the light guides (104). The light entering the light guides (104) is relatively uniform after diffusion with the integration chamber (114) and may be more or less further diffused (e.g., reflected, randomized, etc.) within the light guides (104). Eventually, the relatively uniform light in the light guides (104) can be used to illuminate one or more visual indicators (116).

Figure 1B:
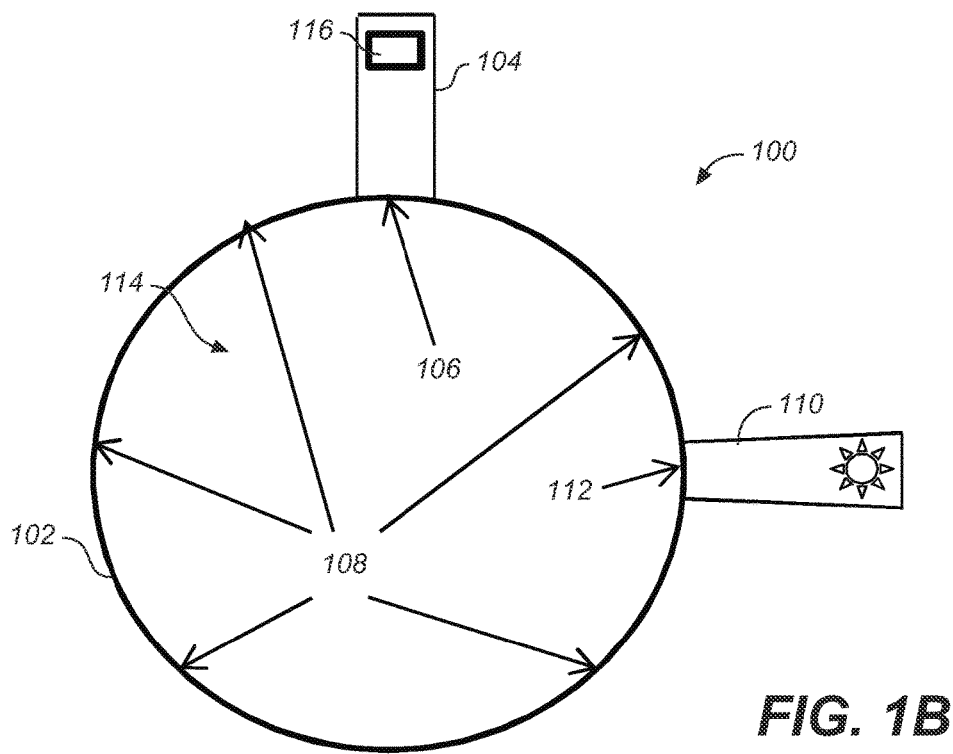

FIG. 1B illustrates another example configuration of the uniform lighting apparatus 100. As shown, the light guide (104) may be of a fan-shape (comprising portions fanning in and out of the plane as represented by FIG. 1B) that surrounds along a portion of circumference of the light diffuser (102). The light source (110) may be of a cone-shape that has an opening (e.g., a pore, etc.) as the ingress areas (112) to inject light into the light diffuser (102). The fan-shape of the light guide (104) may not be coplanar with the cone-shape of the light source (110). As illustrated, the light diffuser (102) is configured as a globular shape to receive light sideways (e.g., vertical to a plane formed with the light guide's fan shape circumference, substantially vertical to such a plane, other sideways incident angles to such a plane, etc.) from the light source (110-1).

Light received by the light diffuser (102) from the light source (110) can be sourced from or injected by one or more active light emitters that may or may not be located within the light source (110). As used herein, an active light emitter may refer to a light emitter that generates (visible or invisible) light. In some embodiments, an active light emitter is located external to the light source (110); light from the external active light emitter is optically guided or directed into the light source (110) with a light guiding/directing mechanism such as one or more of optical fibers, light guide, etc. In some embodiments, an active light emitter is internal to the light source (110); light from the internal active light emitter is generated within the light source (110). An active light emitter may be unidirectional, multi-directional, omni-directional, etc.

The integration chamber (114) can be configured to diffuse and reflect light received from the light source (100) until the light leaves the integration chamber (114) and enters into the light guides (104). The integration chamber (114) may comprise an air filled space, a vacuum-filled space, optically transparent materials, optically dispersive materials, light transmission materials, etc.

The light diffusive areas (108), which may be highly reflective (e.g., a reflectance of 80%, 85%, 90%, 95%, 99%, 99.9%, etc.), can be implemented with reflective/diffusive metallic surfaces, total internal reflection (TIR) surfaces, reflective/diffusive optical films, other light reflective/diffusive materials, etc. Additionally, optionally, or alternatively, the light diffusive areas (108), while being highly reflective, can comprise spatial features, enhancement structures, enhancement materials, light directing features, light diffusing features, light focusing features, etc., that are configured to distribute, diffuse, or direct, light throughout the integration chamber (114).

In some embodiments, the light source (110) may be separately replaceable modules in the uniform lighting apparatus. In some embodiments, the light source (110) may be shared between two or more uniform lighting apparatuses. In some embodiments, the light source (110) and some or all of the uniform lighting apparatus (100) may form a single integrated replaceable module.

For the purpose of illustration only, FIG. 1A and FIG. 1B depict the light diffuser (102) as having a spherical or cylindrical shape. However, in various embodiments, the light diffuser (102) may be of a geometric shape including, but not limited to, any of: rectangular shapes, polygonal shapes, curved shapes, cylindrical shapes, elliptic shapes, spherical shapes, bulbous shapes, irregular shapes, etc., so long as the light diffuser (102) contains an integration chamber (e.g., 114, etc.) in which injected light can be trapped, diffused, reflected, randomized, integrated, etc., and made to travel (e.g., greatly, average, etc.) elongated randomized optical paths within the integration chamber (114) to form uniform light before the uniform light exits into light guides integrated with the light diffuser (102).

Geometric properties of a light diffuser (e.g., 102, etc.) as described herein may be selected based on a number of geometric design factors. Examples of geometric design factors include, but are not limited to, any of: form factors, geometries, etc., of a device hosting the light diffuser; form factors, geometries, etc., of portions of the device's chassis with which the light diffuser may be integrated; form factors, geometries, etc., of visual indicators to be illuminated; contours over which light is to be routed from a light source to illuminate visual indicators such as lighted buttons, etc.; light efficiency relating to how much uniform light can be produced from a unit of injected light, light uniformity relating to how uniform different parts of a visual indicator should be illuminated; optical components related to light guides, light emitters, optical films, optical structural features used for light diffusion; material costs; manufacturing costs/complexities related to molding, casting, assembling, etc.; etc. The light diffuser (102) may be configured with a unitary or complex shape (e.g., one or more spheres, one or more spherical cylinders, etc.) that maximizes the number of reflections and thus greatly increases the optical path of injected light.

For the purpose of illustration, it has been depicted in FIG. 1A and FIG. 1B that the light diffusive areas (108) comprise only one pore as the ingress areas (112) to receive incident light from the light source (110). In various embodiments, one, two, or more pores may be provisioned on the light diffusive areas (108) to receive (injected) light from the light source (110).

For the purpose of illustration, it has been depicted in FIG. 1A and FIG. 1B that the light diffusive areas (108) comprise only one pore as the egress areas (106) to inject relatively uniform light from the light diffuser (102) to the light guides (104). In various embodiments, one, two, or more pores may be provisioned on the light diffusive areas (108) to inject relatively uniform light from the light diffuser (102) to the light guides (104). Optical media may, but are not limited to, be the same across the egress areas (106). For example, both the interior volumes of the light guides (106) may comprise the same light transmissive medium (e.g., vacuum, air, transparent substance to one or more wavelength ranges of visible light, etc.). The interior walls of the light guides (106) may, but are not limited to, be coated with the same optical materials as used in coating the interior walls of the integration chamber (114). The interior walls of the light guides (106) may be coated with a light reflective layer, which may not be the same as used in coating the interior walls of the integration chamber (114).

3. LIGHT DIFFUSION AND INTEGRATION

Figure 1C:
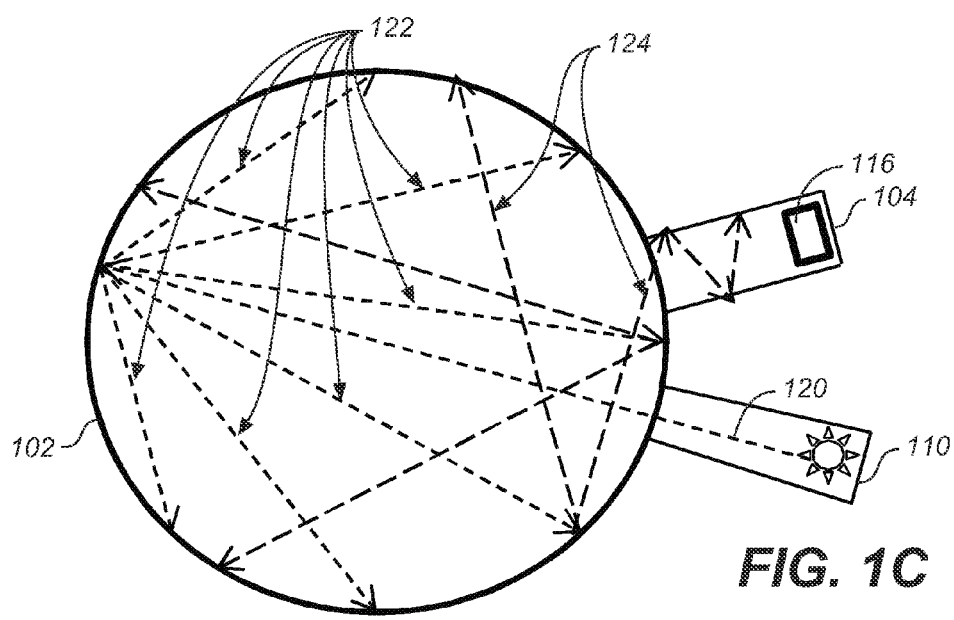
FIG. 1C illustrates light diffusion in an example uniform lighting apparatus.

FIG. 1C illustrates how light can be diffused (e.g., reflected, randomized, integrated, etc.) with a light diffuser (e.g., 100 of FIG. 1A, etc.) as described herein. As shown, the light diffuser (102), or the integration chamber (114) therein, is disposed to receive incident light (120) from the light source (110) through the ingress areas (112). The incident light (120) is diffused within the light diffuser (102) into first multiple light rays (122). A first portion of the first multiple light rays (122) may exit into the light guide (104) through the egress areas (106). A second portion of the first multiple light rays (122) may exit out of the integration chamber (114) from the ingress areas (112) back into the light source (110). A third portion of the first multiple light rays (122) may be further diffused into second multiple light rays (124). The second multiple light rays (124) may similarly comprise various portions exiting into the light guide (104) through the egress areas (106), exiting back into the light source (110) through ingress areas (112), and being further diffused in the light diffuser (102).

To increase the uniformity of the first portion of light that exits into the light guide (104), the light diffuser (102) may be configured to retain a relatively large amount of light in the third portion of light that is to be further diffused, as compared with amounts of light in the other portions of the light that exit out of the integration chamber (114) from the egress areas (104) or the ingress areas (112). In some embodiments, the total area size of the ingress areas (112) is set to be no more than one of 30%, 25%, 20%, 15%, 10%, 5%, etc., of the total area size of the light diffusive areas (108); the total area size of the egress areas (106) is set to be no more than one of 80%, 70%, 60%, 50%, 40%, 30%, 20%, 10%, etc., of the total area size of the light diffusive areas (108).

In some embodiments, the light source (110) is configured with light reflective materials to recycle light exiting out of the integration chamber 114 through the ingress areas (112). In some embodiments, the light source (110) can be configured to inject light through relatively small pores constituting the ingress areas (112).

As used herein, a light guide may refer to a module with a light distribution medium to guide light to visible indicators (e.g., objects whose illumination are visible to a user, edges of the light guide, etc.). In some embodiments, a light guide may be configured to be fixed relative to other components in a uniform lighting apparatus as described herein. In some embodiments, a light guide may be configured to be movable relative to other components in a uniform lighting apparatus as described herein. In some embodiments, a light guide in the light guides (110) can be configured with a length comparable to a spatial dimension (e.g., length, diameter, etc.) of the integration chamber 114 through the ingress areas (112). In some embodiments, a light guide in the light guides (110) can be configured with a length smaller than a spatial dimension (e.g., length, diameter, etc.) of the integration chamber 114 through the ingress areas (112). In some embodiments, a light guide in the light guides (110) can be configured with a length greater than a spatial dimension (e.g., length, diameter, etc.) of the integration chamber 114 through the ingress areas (112). As used herein, "a length of a light guide" generally refers to a spatial dimension of a path along a longitudinal direction (e.g., the direction the light is being guided to illuminate one or more visual indicators, etc.) of the light guide; "a width of a light guide" generally refers to a spatial dimension in a transverse direction to the longitudinal direction of the light guide.

4. LIGHT DIFFUSIVE FILM

Figure 2:
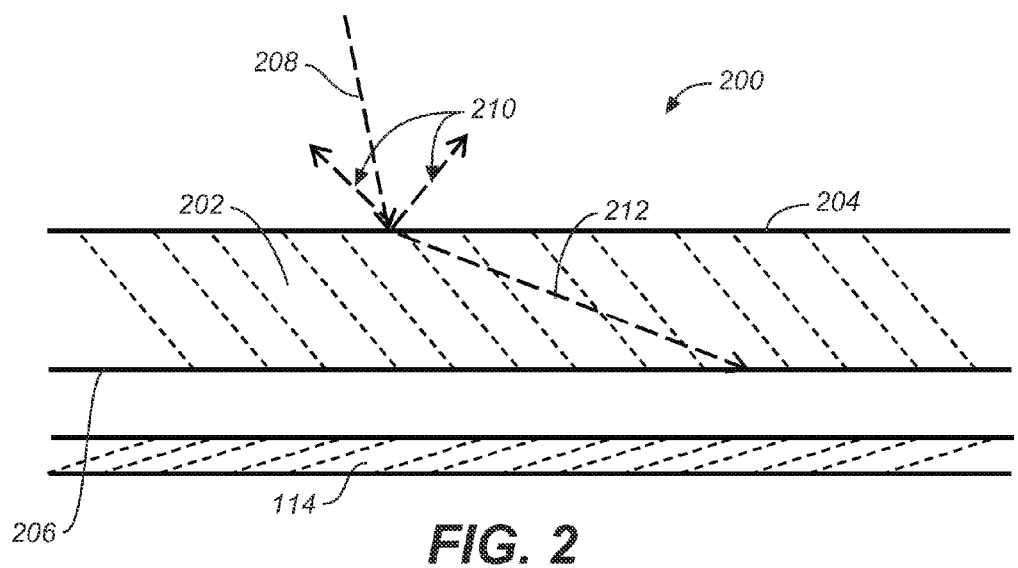
FIG. 2 illustrates an example light diffusive area.

FIG. 2 illustrates an example diffusive structure 200 that can be disposed in the interior walls of an integration chamber (e.g., 114, etc.) to form one or more light diffusive areas (e.g., 108, etc.). The diffusive structure 200 comprises an interior layer (202) of light transmissive medium such as clear plastics, optical films that are transparent to visible light, etc. One or both of the outer surfaces (204 and 206) of the interior layer (202) can be coated with a diffusive substance such as white paint, ultra-white paint, titanium oxide materials, etc., to form one or more light diffusive surface. For the purpose of illustration, in the diffusive structure (200), the outer surfaces (204 and 206) are both light diffusive surface. The first outer surface (204) may be configured to face the interior of the light diffuser (102). The second outer surface (206) may be configured to be disposed next to the interior walls (which may be highly reflective) of the integration chamber (114). When light 208 incident on the first outer surface (204), a first portion (210) of the light (208) is diffused and reflected back into the interior of the integration chamber (114), where as a second portion (212) of the light (208) passes through the interior layer (202) and are diffused/reflected by the second outer surface (206).

In some embodiments, any light transmitting through the second outer surface (206) can be reflected back towards the interior of the integration chamber (114) by the highly reflective walls of the integration chamber (114). In some embodiments, no diffusive coating is made at the second outer surface (206); light can be reflected back (e.g., by total internal reflection, etc.) towards the first outer surface (204) without being diffused at the second outer surface (206).

Other ways of diffusing light may be used by the light diffusive areas (108). For example, the example diffusive structure (200) may be a diffusive film, silver coating, a diffusive layer with texture, structural features, reflective bumpy surface, etc., instead of a transparent interior layer coated with diffusive surfaces.

5. CONFIGURATIONS OF UNIFORM LIGHTING APPARATUSES

Figure 3A:
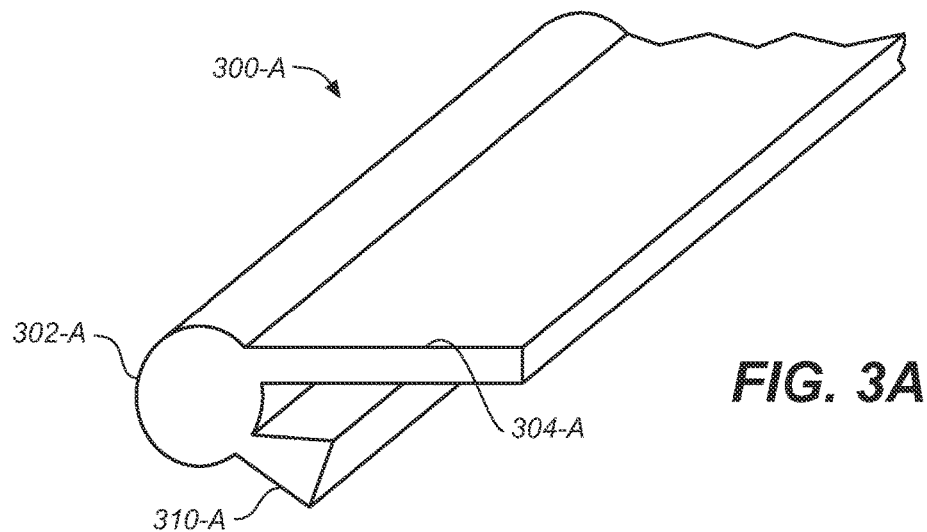
FIG. 3A through FIG. 3E illustrate example configurations of uniform lighting apparatuses.

FIG. 3A through FIG. 3E depict some example forms of uniform lighting apparatuses as described herein. In FIG. 3A, a uniform lighting apparatus 300-A (as represented by the uniform lighting apparatus 100 of FIG. 1A) comprises a light source 310-A (as represented by the light source 110 of FIG. 1A) in a conical cylindrical form, a light diffuser 302-A (as represented by the light diffuser 102 of FIG. 1A) in a circular cylindrical form, and a light guide 304-A (as represented by the light guides 104 of FIG. 1A) in a rectangular cylindrical form. In some embodiments, the light guide (304-A) and the light source (310-A) are placed on the same side of the light diffuser (302-A), as illustrated in FIG. 3A. In some embodiments, the light guide (304-A) and the light source (310-A) are placed on different sides of the light diffuser (302-A), as illustrated in FIG. 3A, so long as there exists no direct light path for light emitted from the light source (310-A) to traverse to the light guide (304-A) without first undergoing diffusion in the light diffuser (302-A).

Figure 3B:
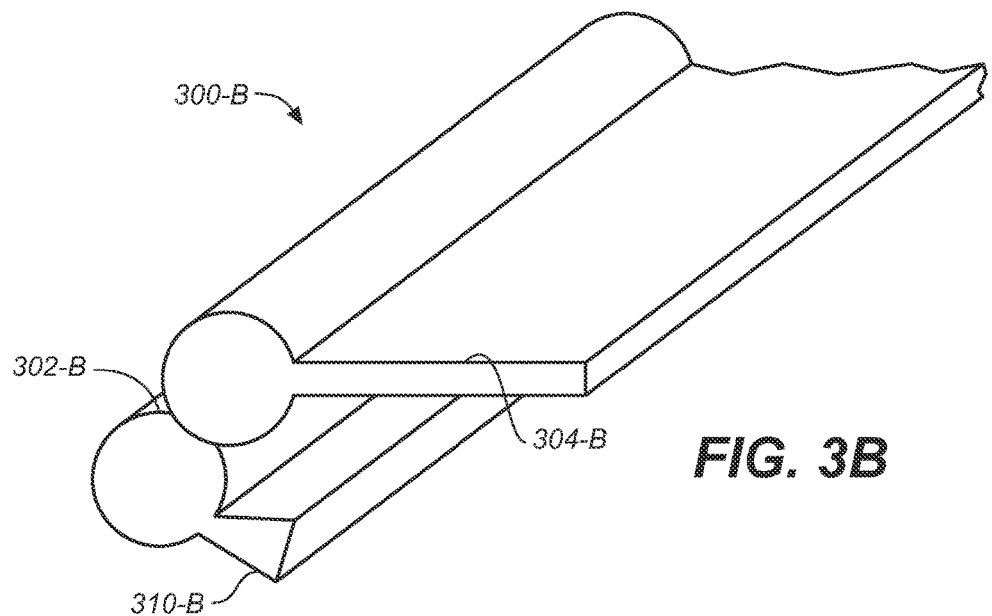

In FIG. 3B, a uniform lighting apparatus 300-B (as represented by the uniform lighting apparatus 100 of FIG. 1A) comprises a light source 310-B (as represented by the light source 110 of FIG. 1A) in a conical cylindrical form, a light diffuser 302-B (as represented by the light diffuser 102 of FIG. 1A) in a complex form joining two circular cylinders, and a light guide 304-B (as represented by the light guides 104 of FIG. 1A) in a rectangular cylindrical form. This configuration can be used to increase the uniformity of light exiting into the light guide (304-B), as well as provide flexible placements of the light guide (304-B) and the light source (310-B). The light guide (304-B) and the light source (310-B) may, but are not required to, be placed on different circular cylinders of the light diffuser (302-B). In an example, the light source (310-B) can be placed anywhere on the circumference of a first circular cylinder of the light diffuser (302-B) while the light guide (304-B) can be placed anywhere on the circumference of a second, different circular cylinder of the light diffuser (302-B), so long as there exists no direct light path for light emitted from the light source (310-B) to traverse to the light guide (304-B) without first undergoing diffusion in the light diffuser (302-B). Additionally, optionally, or alternatively, the size and geometry of the pore between the two circular cylinders may be specifically configured based on how much the light efficiency is to be targeted, how much uniformity of light exiting into the light guide (304-B) is to be targeted, etc.

A light guide (e.g., of one or more light guides 104 of FIG. 1A, etc.) as described herein may be one of a plurality of possible shapes (including but not limited to, any of: rectangular shapes, circular shapes, cylindrical shapes, irregular shapes, etc.). A shape may be selected for the light guide based on a number of geometric design factors. Examples of geometric design factors include, but are not limited to: any of form factors, geometries, etc., of a device hosting the light guide; form factors, geometries, etc., of portions of the device's chassis with which the light guide may be integrated; form factors, geometries of visual indicators to be illuminated; contours over which light is to be routed from a light source to illuminate visual indicators such as lighted buttons, etc.; light efficiency relating to how much uniform light can be produced from a unit of injected light, light uniformity relating to how uniform different parts of a visual indicator should be illuminated; optical components related to light diffusers, light emitters, optical films, optical structural features used for light diffusion; material costs; manufacturing costs/complexities related to molding, casting, assembling, etc.; etc.

Figures 2, 3C:
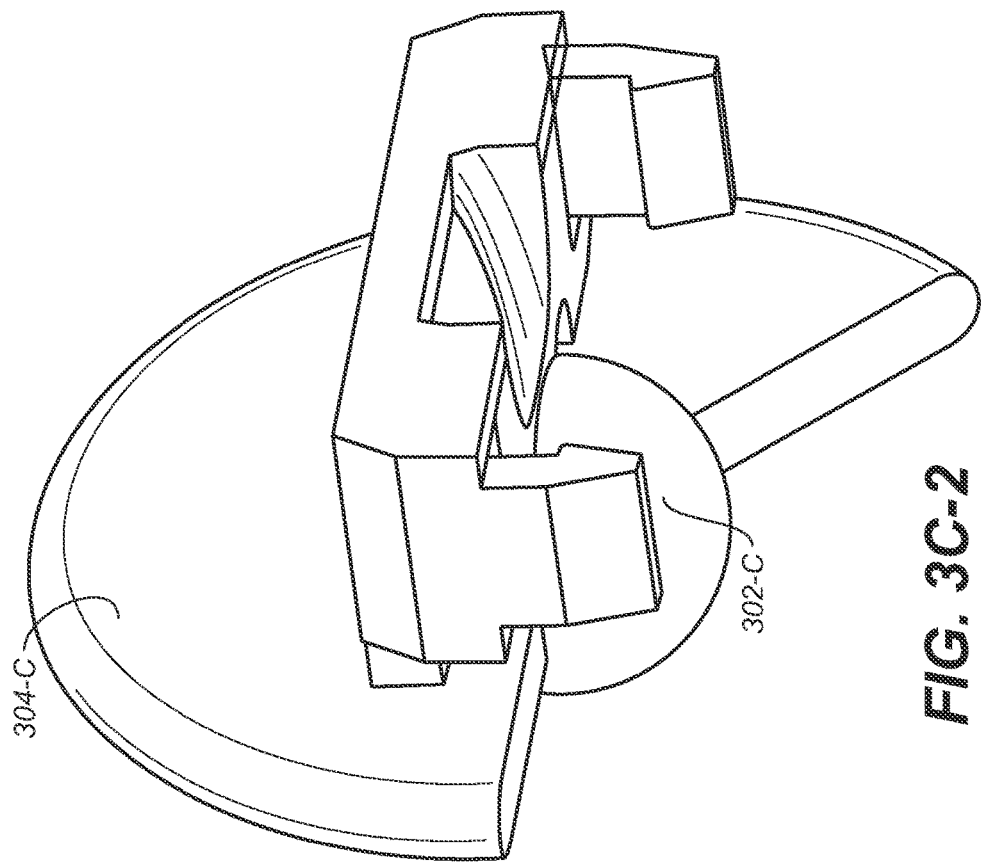
Figures 1, 3C:
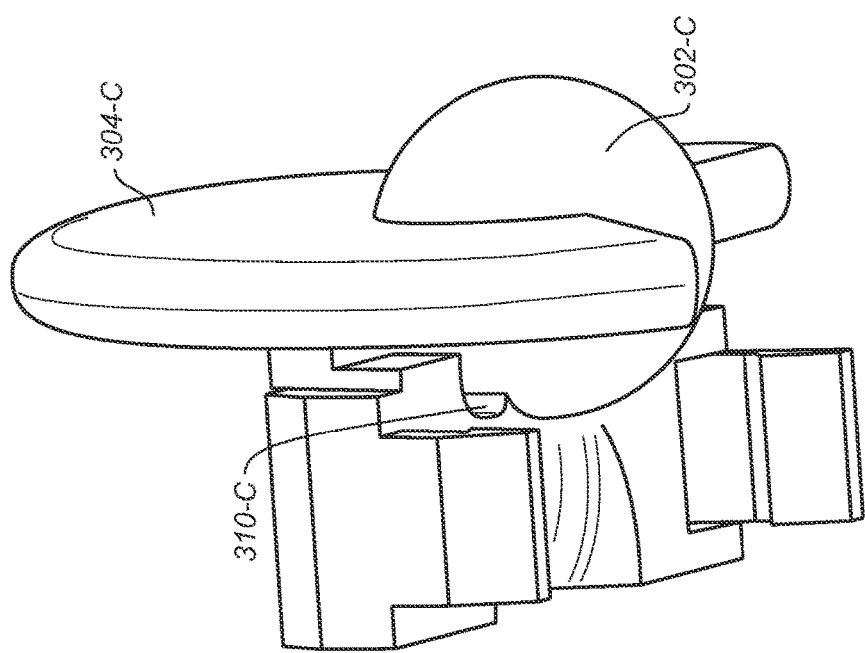

FIG. 3C depicts two views of an example light guide 304-C of a fan-shape profile interfacing with a light diffuser 302-C of a circular profile. The light diffuser (302-C) may be configured as a globular shape to receive light sideways from a light source 310-C, similar to that illustrated in FIG. 1B. Widths (e.g., gradually expanding to form a fan, etc.) of a light guide such as represented by the light guide (304-C), etc., may vary along a longitudinal direction in which uniform light is guided to illuminate an edge of the light guide. The fan-shape profile for the light guide (304-C) and the circular profile for the light diffuser (302-C) may, but are not required to, be concentric, co-curvilinear, etc. In some embodiments, a light diffuser as described herein may take up a spatial profile to shorten the light path to certain portions of a visual indicator, for example, in order to compensate surface light loss on these portions of the visual indicator.

Figure 3D:
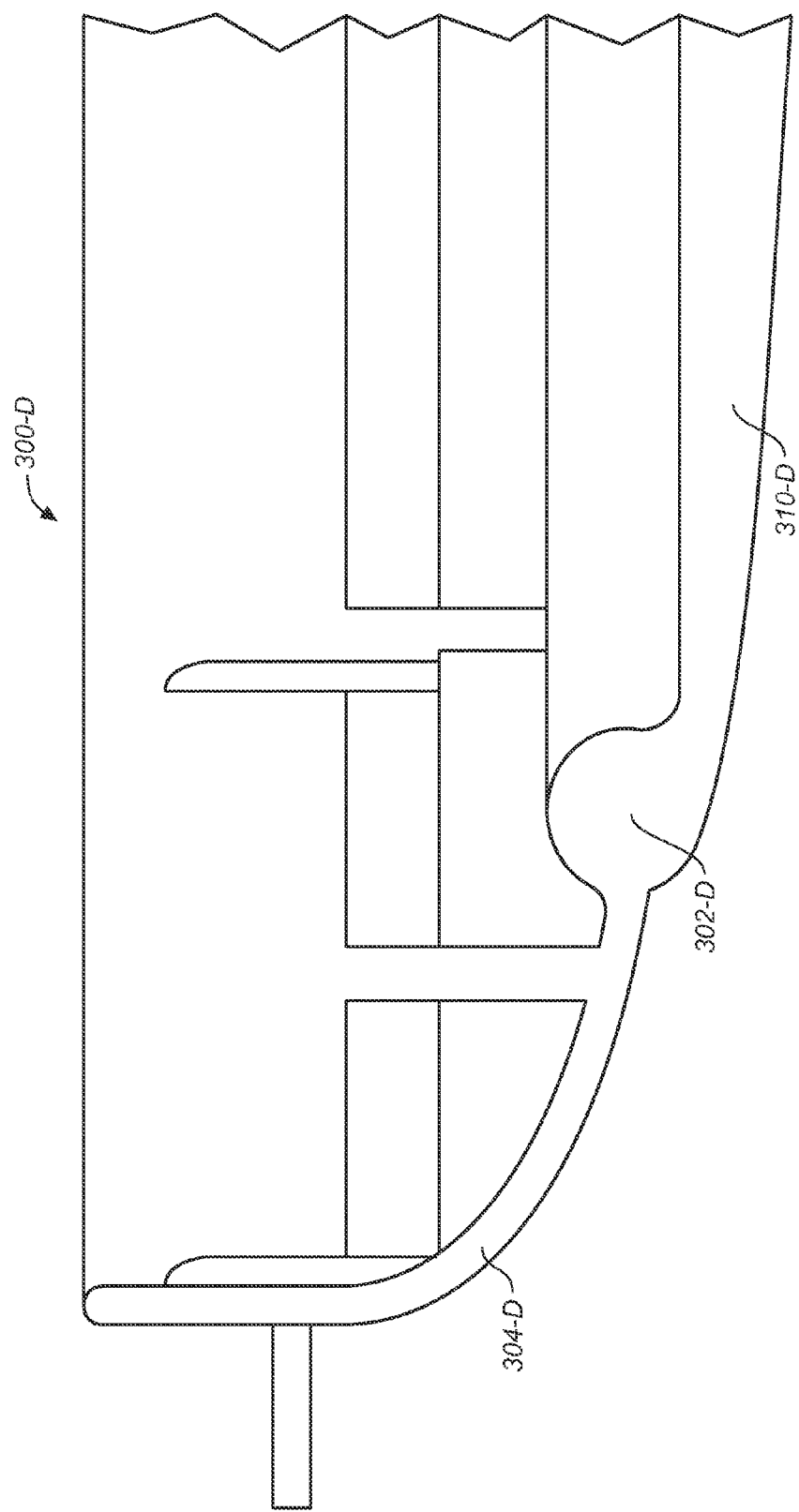

FIG. 3D depicts a light guide 304-D of a first bow-shape profile and a light source 310-D of a second bow-shape profile interconnecting through a light diffuser 302-D. The bow-shape profiles of the light guide (304-D) and the light source (310-D) can conform to the contour portions of the chassis of a device that includes these lighting components/modules. The light diffuser (302-D) may be configured as a globular shape to receive light routed through the light source (310-D). Relatively uniform light randomized in the light diffuser (302-D) is further routed through the light guide (304-D) to illuminate an edge of the light guide (304-D) on the other side. Longitudinal directions of the light guide 304-D and the light source (310-D) can be configured to not coincide with each other so as not to create a direct light path for light emitted from the light source (310-D) to traverse to the light guide (304-D) without first undergoing diffusion in the light diffuser (302-D).

Figure 3E:
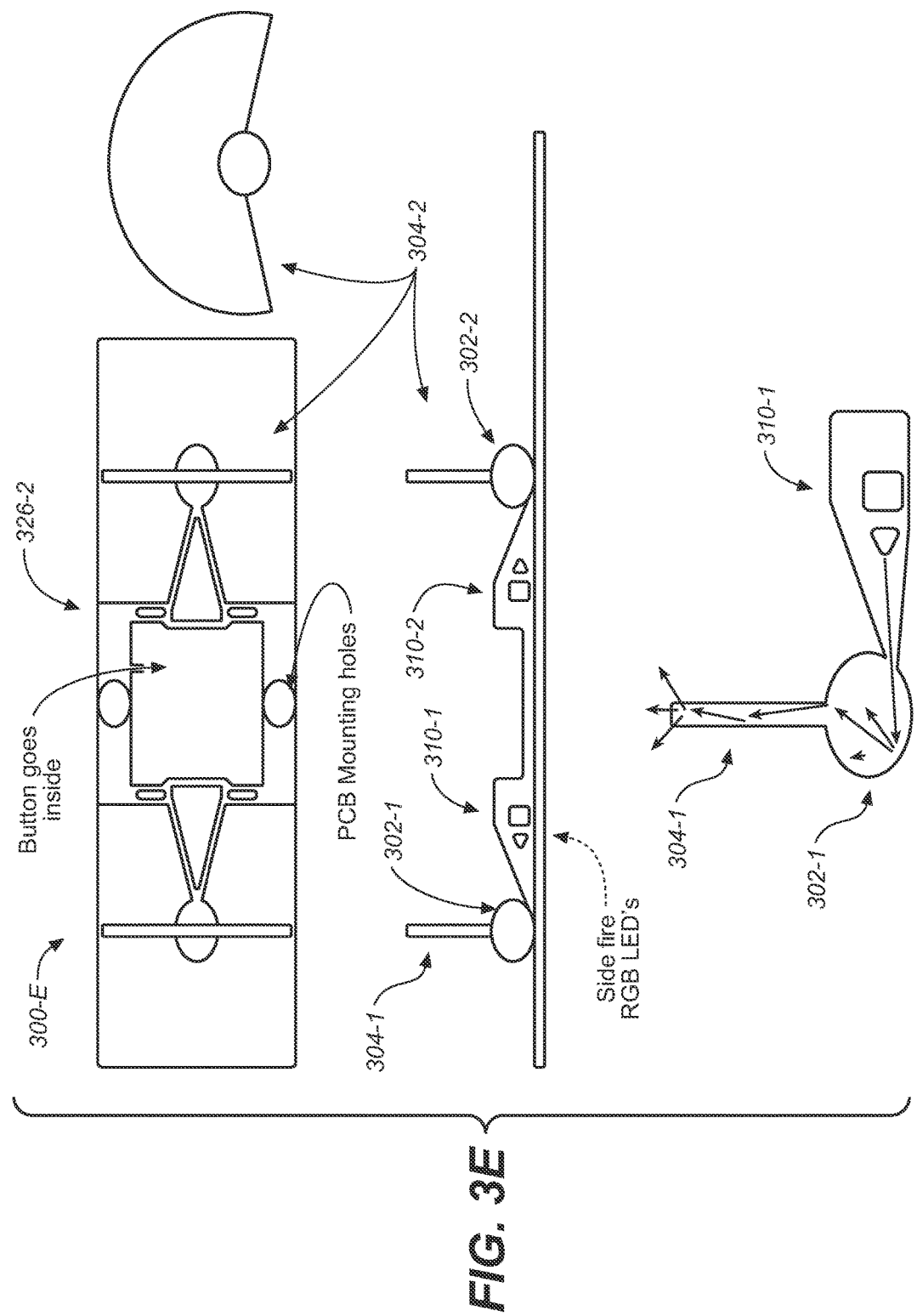

FIG. 3E depicts an example configuration (300-E) that combines two or more uniform lighting apparatuses. As shown, two light sources 310-1 and 310-2 of two uniform lighting apparatuses are under a common light control (326). The light sources (310-1 and 310-2) inject light into two light diffusers 302-1 and 302-2 of circular profiles, respectively. Two light guides 304-1 and 304-2 of fan-shape profiles interface with the two light diffuser (302-1 and 302-2), respectively. Each of the light diffusers (302-1 and 302-2) may be configured as a globular shape to receive light sideways (e.g., vertical to a plane formed with the light guide's fan shape circumference, substantially vertical to such a plane, other sideway incident angles to such a plane, etc.) from the light sources (310-1 and 310-2), for example, as illustrated in FIG. 1B. The common light control (326) such as a control button, etc., may be provisioned to control operational states (e.g., full power-on, power-on with intermediate levels of light emission, power-off, etc.) of the light sources (310-1 and 310-2) in this example configuration.

A uniform lighting apparatus as described herein may be used in an audio device to avoid obstructing sound propagation in the audio device. The uniform lighting apparatus may be used to provide a visual indicator in a manner that does not interfere with the acoustical integrity of audio components in the audio device. A light uniform lighting apparatus as described herein may be added or incorporated into a device without significantly impacting the footprint of the device.

Figure 4A:
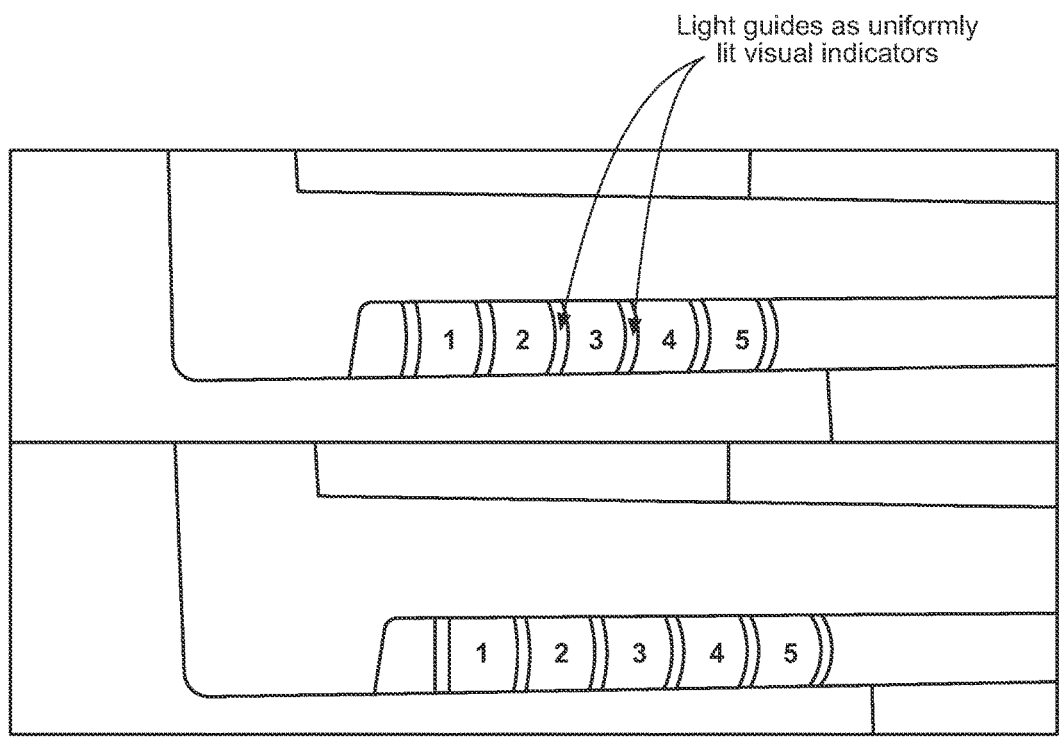
Figure 4B:
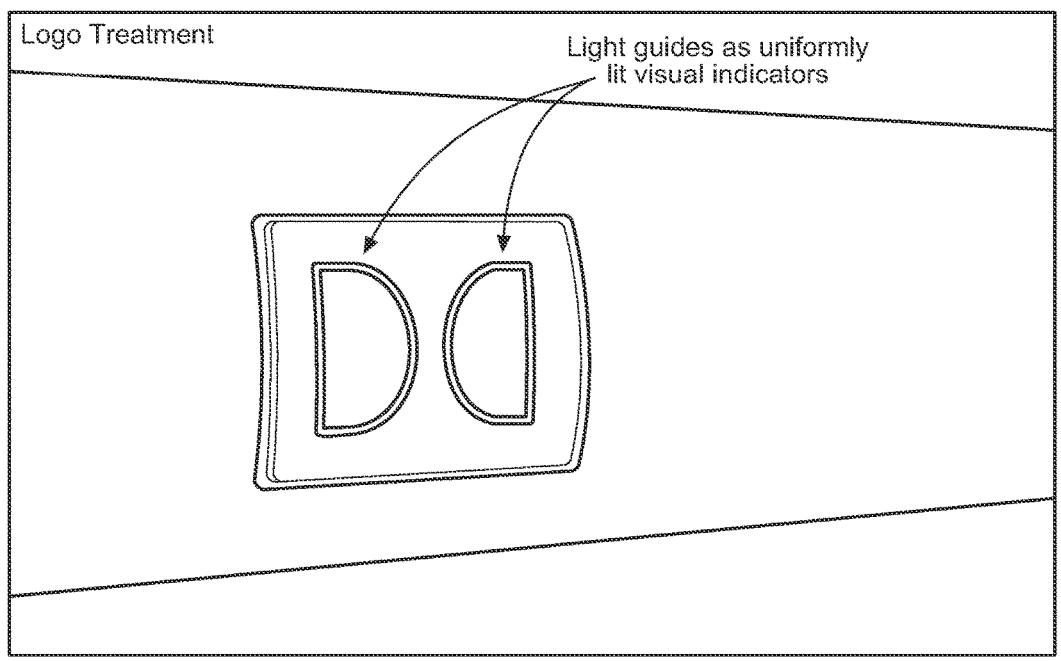

A visual indicator as described herein may be provided as a diffusive surface (e.g., an edge or a portion of an edge with diffusive surface, etc.) a light guide in a uniform lighting apparatus. The diffusive surface of the light guide may cause an edge or a portion thereof of the light guide to give off a uniform glow effect, as illustrated in FIG. 4A through FIG. 4C.

A visual indicator as described herein can be used to convey information with respect to an operation of a device. For a speakerphone device, the visual indicator may be used to identify the status of a call, such as whether a call is muted or on hold. Due to the positioning and geometry of the light guide, the visual indicator may be clearly visible at a wide range of azimuths and altitudes within a room.

A light guide as described herein can be interposed between different modules in an audio or other electronic device. The light guide may or may not be of a straight, tubular design. In some embodiments, the light guide is curved, dish-shaped, bow-shaped, fan-shaped, cone-shaped, symmetrically-shaped, asymmetrically-shaped, custom-shaped, irregularly shaped, etc. The shape of the light guide may conform to a contour or portions thereof of a device in which the light guide is used.

Modules between which a light guide as described herein is positioned may be any device component, system, or subsystem that performs a particular function or a particular set of functions. In an embodiment, a module may be all or part of a sound field rendering system, including a set of speakers and a speaker enclosure. In another embodiment, a module may be all or part of a sound field capture system, including a microphone array, a microphone array housing, etc. In yet another embodiment, the module may include a user interface element, such as a set of one or more buttons or a touch screen, that performs a particular function or set of functions in direct response to a user interaction. For example, the module may be a call mute button that, when pressed, toggles between muting and unmuting a speakerphone during a conference call. In yet another embodiment, a module may be a display system for rendering images and/or videos.

A visual indicator as described herein can be used to convey various types of information. The information and the manner in which the information is conveyed may vary from implementation to implementation based on the nature of the device.

Different colored or multi-color light emitters can be used with a light source as described herein to convey different, color-coded information to the user. In a telephonic device, the light ring may be illuminated one color (e.g., red, etc.) when the call is muted, another color (e.g., green, etc.) when on call and unmuted, and a third color (e.g., blue, etc.) when an incoming or outgoing call supports three-dimensional audio effects. Other colors may be used to indicate information such as the operational status of a device, the type of call to which a telephonic device is connected, the quality of the audio, etc. Light intensity as perceived with a visual indicator as described herein may increase as the sound picked up by the microphones becomes louder and decrease as the sound becomes quieter. Similarly, the light intensity could indicate the volume level from speakers. A uniform lighting apparatus as described herein may be configured with two or more active light emitters. In some embodiments, at least two light emitters differ in color. In some embodiments, at least two light emitters are settable to different light emission states. For example, a uniform lighting apparatus may be equipped with two or more of a red light emitter, a green light emitter, a blue light emitter, etc. Each of the different color light emitters can be set to different light emission states from no light to maximum light. Thus, any of a plurality of different light colors may be shown in visual indicators with the uniform lighting apparatus under techniques as described herein.

Other lighting effects may also be applied to a visual indicator as described herein to convey light-effect coded information. Such lighting effects may be used to convey, without limitation, any of the information described above such as operations of a device, qualities of audio/video content, the intensity/volume/brightness/vividness of audio/video content, any other type of information responsive to input received by the device, etc.

6. DESCRIPTIONS OF SOME EMBODIMENTS

In some embodiments, an apparatus comprises: a light source; one or more light guides; a light diffuser having an integration chamber surrounded by one or more light diffusive areas, the one or more light diffusive areas being configured with one or more first openings as one or more ingress areas to receive light from the light source and one or more second openings as one or more egress areas to provide light to the one or more light guides.

In an embodiment, the light source comprises one or more active light emitters. In an embodiment, the light source propagates source light from one or more active light emitters is shared by the light diffuser and a second light diffuser that diffuses light into one or more second light guides, and wherein the light diffuser and the second light diffuser are disjoint. In an embodiment, the light diffuser shares source light from one or more active light emitters with a second light diffuser. In an embodiment, a same light emitter control sets operational states of the one or more active light emitters from which the source light is shared by the light diffuser and the second light diffuser.

In an embodiment, the one or more light guides comprise one or more diffusive surface portions as one or more visual indicators to a user of a device that includes the apparatus. In an embodiment, the one or more light guides illuminate one or more components representing one or more visual indicators to a user of a device that includes the apparatus.

In an embodiment, the integration chamber is filled with a light transmission medium. In an embodiment, the light transmission medium is one or more of air, vacuum, optical media transparent to at least one wavelength range of visible light, or optical media diffusive to at least one wavelength range of visible light.

In an embodiment, the light received from the light source is emitted from at least one of: light-emitting diodes (LEDs), cold cathode fluorescent lights (CCFLs), quantum-dot based light converters, organic light-emitting diodes (OLEDs), fluorescent lights, incandescent lights, gas discharge lights, etc.

In an embodiment, the apparatus is configured to regulate an amount of the light received from the light source from no light to a maximum light.

In an embodiment, the total area size of the one or more ingress areas represents a specific percentile value, in a value range of 0.1-49%, of the total area size of the one or more light diffusive areas. In an embodiment, the total area size of the one or more egress areas represents a specific percentile value, in a value range of 1-80%, of the total area size of the one or more light diffusive areas.

In an embodiment, a combination of the one or more light diffusive areas, one or more ingress areas, and one or more egress areas represents at least one of: rectangular shapes, polygonal shapes, curved shapes, cylindrical shapes, elliptic shapes, spherical shapes, bulbous shapes, irregular shapes, etc. In an embodiment, a combination of the one or more light diffusive areas, one or more ingress areas, and one or more egress areas represents two or more connected bulbous, cylindrical, tubular, etc., shapes.

In an embodiment, at least one light diffusive area in the one or more light diffusive areas comprises an interior transparent medium section with at least one exterior light diffusive surface. In an embodiment, at least one light diffusive area in the one or more light diffusive areas comprises a metallic light diffusive surface. In an embodiment, at least one light diffusive area in the one or more light diffusive areas comprises a non-metallic light diffusive surface.

In an embodiment, the light received by the light diffuser from the light source traverses through an input light guide. In an embodiment, the input light guide follows a portion of a contour of a chassis of a device.

In an embodiment, at least one light guide in the one or more light guides follows a portion of a contour of a chassis of a device. In an embodiment, the portion of a contour of a chassis of a device is curved.

In an embodiment, a light guide in the one or more light guides is configured to guide light, entering into the light guide from a respective egress area of the one or more egress areas, along a longitudinal direction towards an edge of the light guide, and wherein at least a portion of the edge of the light guide represents a visible indicator to a user of a device that includes the apparatus. In an embodiment, widths of the light guide along the longitudinal direction are uniform. In an embodiment, widths of the light guide along the longitudinal direction are non-uniform.

In an embodiment, the apparatus is configured to prevent direct light transmission from the light source to any of the one or more light guides.

In an embodiment, the light received by the light diffuser is one or more of monochrome light or colored light.

In an embodiment, the light diffuser and the one or more light guides form a single contiguous module [manufactured as a single piece, coated with the same materials].

In an embodiment, one or more interior surfaces of the one or more light guides are light diffusive. In an embodiment, one or more interior surfaces of the one or more light guides are light reflective.

In an embodiment, at least one of the one or more light guides is movable relative to the light diffuser.

In an embodiment, the apparatus forms a part of a chassis of a device. In an embodiment, the apparatus is a part of: a handheld display device, a tablet computing device, a personal computing device, a television system, a theater-based display system, or an outdoor display system. Note that, although separate embodiments are discussed herein, any combination of embodiments and/or partial embodiments discussed herein may be combined to form further embodiments.

7. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
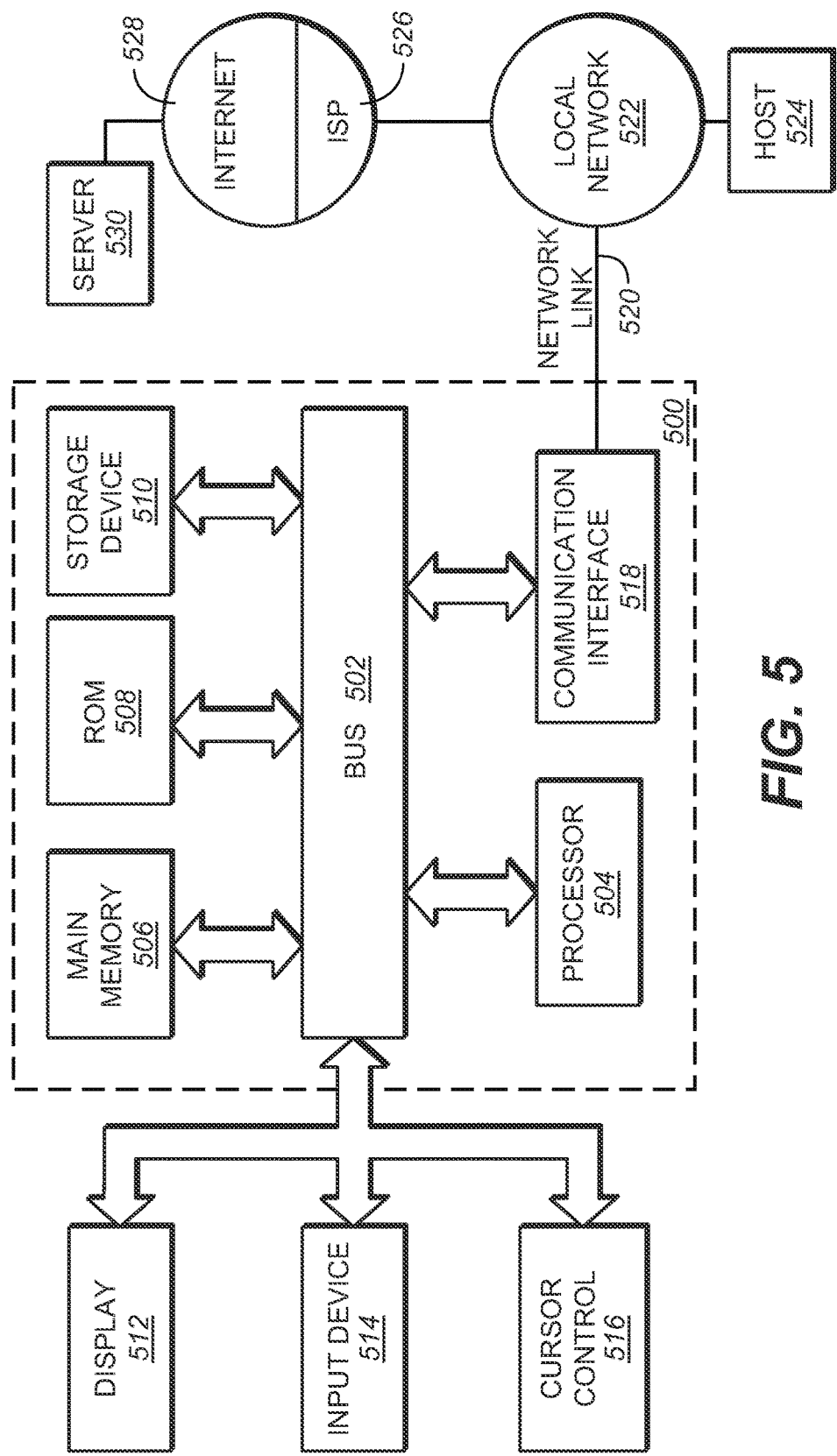
FIG. 5 illustrates an example hardware platform on which a computer or a computing device as described herein may be implemented, in accordance with an embodiment.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A uniform lighting apparatus for visually indicating an operational status of a device to a user, comprising:
a light source comprising one or more active light emitters configured to generate light;
one or more light guides, at least one of the one or more light guides being a visual indicator coupled to a chassis of the apparatus, wherein the uniform lighting apparatus is configured to indicate the operational status of the device by respective colors and/or intensities of the generated light to distinguish at least three different operational states of the device;
a light diffuser having an integration chamber surrounded by one or more light diffusive areas, the one or more light diffusive areas being configured with one or more first openings as one or more ingress areas to receive light from the light source and one or more second openings as one or more egress areas to provide light to the one or more light guides with increased light uniformity.

2. The apparatus of claim 1, wherein the uniform lighting apparatus is configured to indicate a quantified operational status of the device by corresponding intensities of the generated light.

3. The apparatus of claim 1, wherein the light source comprises two or more active light emitters, and wherein at least two of the two or more active light emitters differ in color.

4. The apparatus of claim 1, wherein the light source comprises two or more active light emitters, and wherein at least two of the two or more active light emitters are settable to different light emission states.

5. The apparatus of claim 1, wherein the light source that propagates source light from one or more active light emitters is shared by the light diffuser and a second light diffuser that diffuses light into one or more second light guides, and wherein the light diffuser and the second light diffuser are disjoint.

6. The apparatus of claim 1, wherein the light diffuser shares source light from one or more active light emitters with a second light diffuser.

7. The apparatus of claim 6, wherein a same light emitter control sets operational states of the one or more active light emitters from which the source light is shared by the light diffuser and the second light diffuser.

8. The apparatus of claim 1, wherein the one or more light guides comprise one or more diffusive surface portions as one or more visual indicators to a user of a device that includes the apparatus.

9. The apparatus of claim 1, wherein the one or more light guides illuminate one or more components representing one or more visual indicators to a user of a device that includes the apparatus.

10. The apparatus of claim 1, wherein the integration chamber is filled with a light transmission medium.

11. The apparatus of claim 1, wherein a light transmission medium is one or more of air, vacuum, optical media transparent to at least one wavelength range of visible light, or optical media diffusive to at least one wavelength range of visible light.

12. The apparatus of claim 1, wherein the light received from the light source is emitted from at least one of: light-emitting diodes (LEDs), cold cathode fluorescent lights (CCFLs), quantum-dot based light converters, organic light-emitting diodes (OLEDs), fluorescent lights, incandescent lights, or gas discharge lights.

13. The apparatus of claim 1, wherein the apparatus is configured to regulate an amount of the light received from the light source from no light to a maximum light.

14. The apparatus of claim 1, wherein a total area size of the one or more ingress areas represents a specific percentile value, in a value range of 0.1-49%, of the total area size of the one or more light diffusive areas.

15. The apparatus of claim 1, wherein a total area size of the one or more egress areas represents a specific percentile value, in a value range of 1-80%, of the total area size of the one or more light diffusive areas.

16. The apparatus of claim 1, wherein a combination of the one or more light diffusive areas, one or more ingress areas, and one or more egress areas represents at least one of: rectangular shapes, polygonal shapes, curved shapes, cylindrical shapes, elliptic shapes, spherical shapes, bulbous shapes, or irregular shapes.

17. The apparatus of claim 1, wherein a combination of the one or more light diffusive areas, one or more ingress areas, and one or more egress areas represents two or more connected shapes.

18. The apparatus of claim 1, wherein at least one light diffusive area in the one or more light diffusive areas comprises an interior transparent medium section with at least one exterior light diffusive surface.

19. The apparatus of claim 1, wherein at least one light diffusive area in the one or more light diffusive areas comprises a metallic light diffusive surface.

20. The apparatus of claim 1, wherein at least one light diffusive area in the one or more light diffusive areas comprises a non-metallic light diffusive surface.

21. The apparatus of claim 1, wherein the light received by the light diffuser from the light source traverses through an input light guide.

22. A device comprising the apparatus of claim 19, wherein an input light guide follows a portion of a contour of a chassis of the device.

23. A device comprising the apparatus of claim 1, wherein at least one light guide in the one or more light guides follows a portion of a contour of a chassis of the device.

24. The device of claim 23, wherein the portion of the contour of the chassis of the device is curved.

25. The apparatus of claim 1, wherein a light guide in the one or more light guides is configured to guide light, entering into the light guide from a respective egress area of the one or more egress areas, along a longitudinal direction towards an edge of the light guide, and wherein at least a portion of the edge of the light guide represents a visible indicator to a user of a device that includes the apparatus.

26. The apparatus of claim 25, wherein widths of the light guide along the longitudinal direction are uniform.

27. The apparatus of claim 25, wherein widths of the light guide along the longitudinal direction are non-uniform.

28. The apparatus of claim 1, wherein the apparatus is configured to prevent direct light transmission from the light source to any of the one or more light guides.

* * * * *